UNITED STATES PATENT OFFICE.

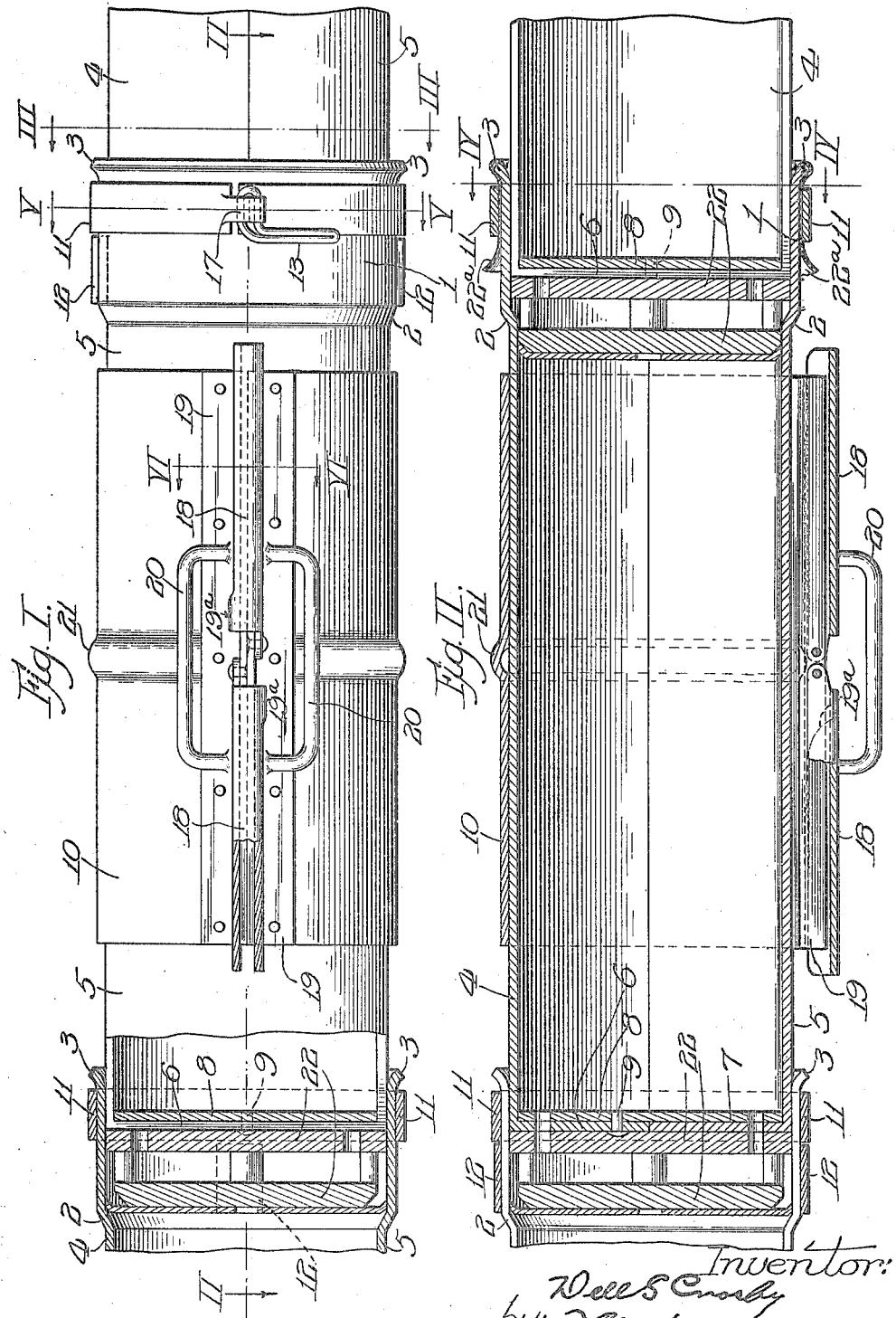

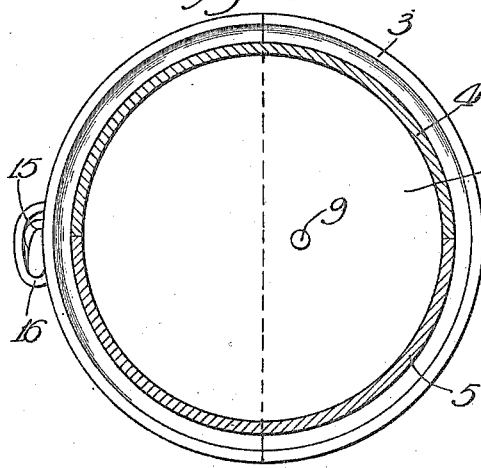
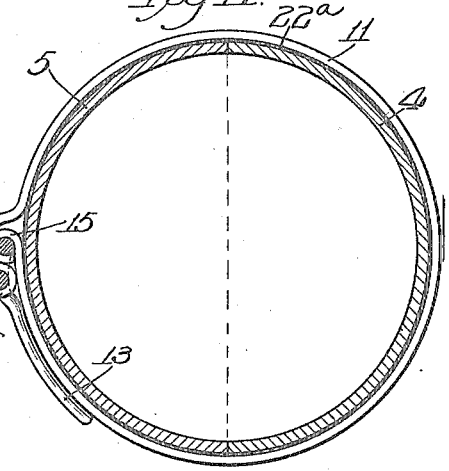
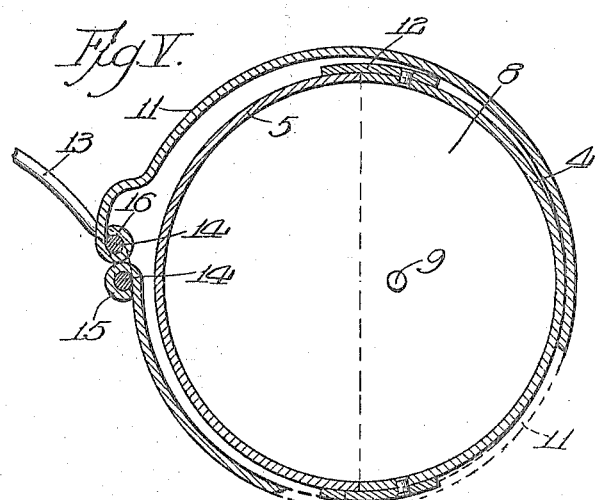
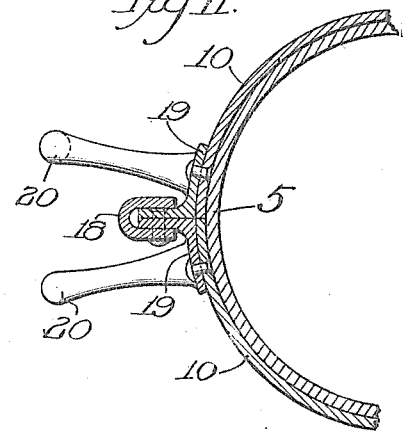
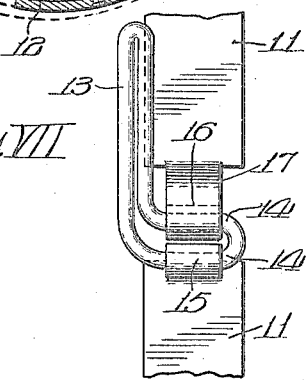

DELL S. CROSBY, OF CHICAGO, ILLINOIS.

CHEESE-MOLD.

1,273,335.   Specification of Letters Patent.   Patented July 23, 1918.

Application filed March 6, 1918. Serial No. 220,755.

*To all whom it may concern:*

Be it known that I, DELL S. CROSBY, a citizen of the United States, residing in Chicago, in the county of Cook and State of Illinois, have invented certain new and useful Improvements in Cheese-Molds, of which the following is a specification.

The present invention relates more particularly to improvements upon the cheese molds shown and described in my co-pending applications filed October 18, 1917 and December 14, 1917 and bearing Serial Numbers 197,253 and 207,145, respectively and the object of the present invention may be stated, briefly, to be the providing of a cheese mold having advantages, in some respects, over the mold shown in either of said applications.

It may be here stated that all of the molds above referred to have "hoops" (so called) that are formed in separable longitudinal sections and the present invention may be said to relate more especially to improved means for normally securing the longitudinal hoop-sections together during the operation of compressing the curd and unsecuring them and allowing them to be separated, when the compressing operation is completed, so as to allow of the removal of the compressed cheese with the utmost facility.

In this application the term "hoop" is used to denote the tube in which the curd is placed to be compressed and the term "mold" is used to comprehend the hoop and whatever other parts are accessory to it and necessary to mold the cheese.

Molds embodying the invention may be used singly (*i. e.* individually) or a number of them may be used together, placed end to end in a gang or series in the manner well known in the art.

The invention consists in the features of novelty that are hereinafter described with reference to the accompanying drawings which are made a part of this specification and in which:—

Figure I is a side elevation of one complete cheese mold, including the hoop and its accessories, and fragments of the adjacent ends of two adjacent molds of a gang or series in which the complete mold is arranged.

Fig. II is an axial section thereof.

Fig. III is an end elevation of the open or receiving end of one complete mold viewed in the direction the arrow III, Fig. I.

Fig. IV is a transverse section on the line IV—Fig. II, showing the clamping ring closed and Fig. V is a section on line V Fig. I showing it open.

Fig. VI is a transverse section on the line VI—VI Fig. I, looking in the direction of the arrows.

Fig. VII is a detail elevation of fragments of the clamping ring.

The hoop consists of a tube of cylindrical cross section and of two diameters, being of larger diameter at its receiving end, as shown at 1, to form an internal annular shoulder 2.

The margin of this enlarged portion is flared outward slightly as shown at 3 to facilitate the insertion of the closed end of the hoop of the next adjacent mold of the series. The hoop is formed of two semi-cylindrical parts or sections, 4 and 5, and its end opposite the enlarged receiving end is closed by a head made up of two circular disks the outer one of which is in semi-circular halves, 6 and 7, secured by brazing, welding, soldering, or other suitable means to the longitudinal hoop sections 4 and 5 respectively, so that they come together, edge to edge, on the diametrical line of separation of said hoop sections. The inner disk, 8, is a complete circle of equal diameter with the interior of the hoop. To one section of the outer disk is permanently secured a pin, 9, which, when the parts are assembled, occupies a perforation in the inner continuous disk 8 and so that the two half sections of the hoop may be completely separated, when the molded cheese is to be removed.

The two longitudinal sections of the hoop are normally held together, so as to permit of their separation by a split clamping sleeve, 10, and a split clamping ring, 11, each having means for tightly clamping it around the split hoop and holding it in place thereon.

For guiding the approach of the edges of the hoop sections as they are being brought together each section carries a lip 12 which overlaps the edge of the other section, these lips preferably being plates each of which is secured by some suitable means to one hoop section, in position to project beyond its edge and overlap the other section. The split clamping ring 11 surrounds the enlarged part 1 of the hoop, between the flare 3 and the lips 12, and its ends are drawn together so as to tighten it around the hoop by a lever 13 having two parallel journal-like portions or fulcrums 14 which occupy eyes, or short tubular portions 15, and 16 carried by the respective meeting ends of the clamping ring, the eye 16 being formed in an extension 17 which, when the ring is tightened projects beyond the eye 15.

The meeting edges of the clamping sleeve are held together by latches 18 of U-shape cross section which straddle the parallel flanges of angle-irons 19 which are secured to the meeting edges of the split clamping sleeve 10 in a manner similar to that in which the meeting edges of the hoop-sections are secured together as shown in my aforesaid application Serial No. 207,145. To facilitate the proper closing of the latch one of its sides is slightly flared as at 19ª in the vicinity of its pivot and this flaring portion will have a tendency to draw the parallel flanges of the angle irons together.

Suitable handles 20 are secured to the clamping sleeve near its split edges.

The sleeve 10 is strengthened by a pressed up rib 21.

In using the mold thus constructed, the two sections of the hoop are first put together, the clamping sleeve 10 contracted and its meeting edges secured together by closing the latches 18 over the parallel flanges of the angle irons 19. A tube of cheese cloth, or whatever else is to form the jacket of the cheese, is inserted in the hoop, leaving the cheese cloth extending some distance beyond the open end of the hoop. This extending portion of the cloth is then bent back over and around the end of the hoop as at 22ª. The split clamping ring, which when open is of sufficient diameter to permit it, is then slipped over the open end of the hoop and down around the reflexed portion 22ª of the cloth, after which the clamping ring is tightened by moving the lever 13 from the position shown in Fig. VII to the position shown in Fig. IV. The cloth lined hoop is then filled with curd and the follower 22 inserted, after which the mold, filled with curd is ready for the press. As for the construction and mode of operation of the follower, suffice it to say that they are precisely as shown in my aforesaid application Serial No. 207,145. The follower is of variable diameter and is adapted, when it engages the shoulder 2, to contract and enter that portion of the hoop which is of smaller diameter.

It is intended that, in operation the hoop shall be filled with a sufficient quantity of curd that the closed end of one hoop shall never reach the shoulder 2 of the hoop which it enters.

It is desirable, though not necessary that in using the mold the clamping sleeve and clamping ring be so placed upon the hoop that they will break the joints between its longitudinal sections.

What I claim as new is:—

1. A cheese mold having in combination a hoop made in longitudinal sections, a split clamping sleeve surrounding said hoop, and means for securing together the meeting edges of the clamping sleeve.

2. A cheese mold having in combination a tubular hoop made in longitudinal sections and open at one end, a head closing the hoop at the other end, said head comprising two disks, one of which is circular, equal in diameter to the internal diameter of the hoop and secured at one of its sides to one of the hoop-sections and the other of which is made in two semi-circular parts, each secured at its peripheral edge to one of the hoop-sections and means for separably securing the edges of the longitudinal hoop-section together.

3. A cheese mold having in combination a tubular hoop made in longitudinal sections and open at one end a split clamping ring surrounding the hoop near its open end, and means for drawing together the adjacent ends of said clamping ring to contract it around the hoop.

4. A cheese mold having in combination a tubular hoop made of longitudinal sections, said hoop being open at one end and of two diameters being of larger diameter at its open end to provide an internal annular shoulder, a split clamping ring surrounding the hoop at its portion of larger diameter, and means for drawing together the adjacent ends of said clamping ring to contract it around the hoop.

5. A cheese mold having in combination, a tubular hoop, adapted to receive within it a tubular casing of cheese cloth or the like, the open end of which is reflexed or doubled backward over the end of the hoop, a split clamping ring surrounding the end of the hoop and the reflexed portion of the tubular casing, and means for drawing together the adjacent ends of said clamping ring to clasp it upon the reflexed end of the tubular casing aforesaid, and the latter against the hoop.

DELL S. CROSBY.

Witnesses:
L. M. HOPKINS,
IDA H. TODD.

Copies of this patent may be obtained for five cents each, by addressing the "Commissioner of Patents, Washington, D. C."